(12) United States Patent
Thiesse et al.

(10) Patent No.: US 11,549,224 B2
(45) Date of Patent: Jan. 10, 2023

(54) PAVER CONVEYOR WEAR PLATES

(71) Applicant: Caterpillar Paving Products Inc., Brooklyn Park, MN (US)

(72) Inventors: Chad M. Thiesse, Brooklyn Park, MN (US); Reece A. Berns, Otsego, MN (US); Dustin Wade Bryan, Blaine, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 360 days.

(21) Appl. No.: 16/835,842

(22) Filed: Mar. 31, 2020

(65) Prior Publication Data
US 2021/0301477 A1   Sep. 30, 2021

(51) Int. Cl.
*E01C 19/48* (2006.01)
*E01C 19/20* (2006.01)
*B65G 15/12* (2006.01)

(52) U.S. Cl.
CPC .............. *E01C 19/48* (2013.01); *E01C 19/20* (2013.01); *B65G 15/12* (2013.01); *E01C 2019/2075* (2013.01)

(58) Field of Classification Search
CPC .. E01C 19/20; E01C 19/48; E01C 2019/2075; B65G 5/12
USPC ............. 404/72, 83, 701–110, 118, 101–110
See application file for complete search history.

(56) References Cited

U.S. PATENT DOCUMENTS

| | | | |
|---|---|---|---|
| 4,012,160 A | * | 3/1977 | Parker ................. E01C 19/4873 404/84.05 |
| 6,401,912 B1 | * | 6/2002 | Bandy, Jr. ............ B65G 19/285 198/860.3 |
| 8,496,401 B1 | | 7/2013 | Van Beek et al. |
| 9,739,020 B2 | | 8/2017 | Comer et al. |
| 2013/0183092 A1 | * | 7/2013 | Van Beek ............... E01C 19/48 404/108 |

FOREIGN PATENT DOCUMENTS

CN   202809444 U   3/2013

\* cited by examiner

*Primary Examiner* — Raymond W Addie
(74) *Attorney, Agent, or Firm* — Jeffrey A. Greene

(57) ABSTRACT

A wear plate for the conveyor of a paving machine has a bend at one axial end, an oblique flat surface at another axial end, a tab with an aperture extending from a side surface, or a tab extending from a side surface with a tapered configuration.

17 Claims, 7 Drawing Sheets

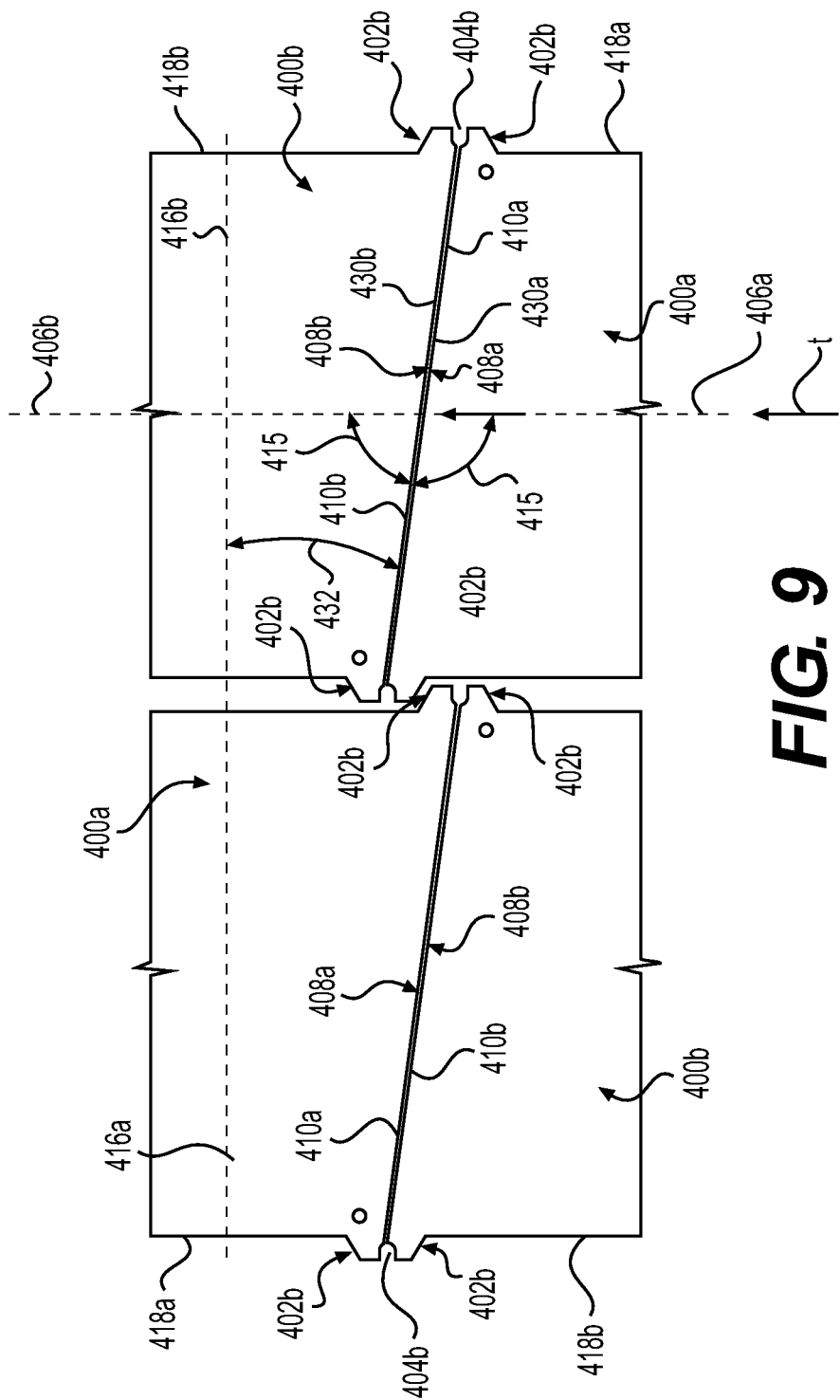

PAVER CONVEYOR WEAR PLATES

TECHNICAL FIELD

The present disclosure relates to a feeder floor protection system for a paving machine. Specifically, the present disclosure relates to a feeder floor protection system including wear plates including locating tabs/extrusions and/or beveled interfaces.

BACKGROUND

A paving machine, such as an asphalt paver, is generally a self-propelled machine designed to receive, convey, distribute, and partially compact paving materials such as asphalt. Typically, the paving machine receives the paving material in a hopper positioned at the front of the machine, conveys the paving material from the hopper to the rear of the machine with parallel slat conveyors (may be referred to as a feeder system), distributes the paving material along a desired width, and compacts the paving material into a mat with a screed. Each slat conveyor that moves the paving material from the receiving hopper to the rear of the paving machine generally consists of two parallel slat chains (may also be referred to as conveyor chains) with a multitude of transverse slats (may also be referred to as a feeder bar) connected there between. Each slat chain is pulled by one of two sprockets mounted on a common shaft, which, in turn, is driven by an appropriate power source.

The paving material is typically asphalt, and consists of a black and highly viscous liquid or semi-solid. When used in road construction, asphalt usually functions as a binder for a gravel or rock base. The raw material mixture is referred to as a "bituminous aggregate" and the finished road surfacing material is usually called "asphalt concrete." The bituminous aggregate is typically stored and transported at temperatures around 150° Celsius to prevent hardening. Thus, the conveyor system used to channel the bituminous aggregate through a feeder area of the paving machine needs to withstand exposure to the high temperature and rough gravel or rock particles (abrasive) bound within the aggregate. The feeder floor, in particular, is subject to significant wear caused by the bituminous aggregate and, more specifically, conveyance of the aggregate through the feeder area. Consequently, wear plates are typically provided as part of a feeder protection system to protect the feeder bed from wear.

These wear plates are often held in place using fasteners or the like that may be exposed to the asphalt, making their removal problematic. Also, problems with "digging in" as a feeder bar passes over a seam of the wear plates or feeder bar wear as it rotates about the end drive sprocket that occurs with current feeder protection systems.

Chinese Patent No. CN20280944U discloses a wear plate having a bend that may guide the conveyor chain about an end drive sprocket. However, this patent is silent about easing the assembly or disassembly of the wear plate from the feeder protection system, preventing "digging in" as a feeder bar passes over the seam of the wear plates, etc.

Therefore, continuous improvement of feeder protection systems is still warranted.

SUMMARY

A paving machine according to an embodiment of the present disclosure may comprise a frame, a screed, a hopper supported on the frame and configured to receive paving material, a feeder including a feeder bed that extends from the hopper to the screed, a conveyor that is disposed above the feeder bed for conveying the paving material to the feeder, and a feeder protection system including at least a first pair of wear plates covering the feeder bed. Each of the pair of wear plates may include at least one tab defining a tab aperture.

A wear plate according to an embodiment of the present disclosure may comprise a body defining a longitudinal axis, and a transverse axis that is perpendicular thereto. A first axial end, a second axial end, a first side surface extending from the first axial end to the second axial end, and a second side surface extending from the first axial end to the second axial end may also be provided. A first plurality of tabs may be disposed on the first side surface, and a second plurality of tabs may be disposed on the second side surface. At least one tab of the first plurality of tabs may define a tab aperture, and at least one of the second plurality of tabs may define a tab aperture.

A wear plate according to another embodiment of the present disclosure may comprise a body defining a longitudinal axis, and a transverse axis that is perpendicular thereto. A first axial end, a second axial end, a first side surface extending from the first axial end to the second axial end, and a second side surface extending from the first axial end to the second axial end may also be provided. A first plurality of tabs may be disposed on the first side surface and a second plurality of tabs may be disposed on the second side surface. The first axial end may include a first oblique flat surface relative to the transverse axis forming an acute angle therewith, and the second axial end may include a bend defining a radius of curvature in a plane perpendicular to the transverse axis.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 9 is an enlarged detail view of the beveled interfaces of the wear plates of FIG. 8.

DETAILED DESCRIPTION

Figure 1:
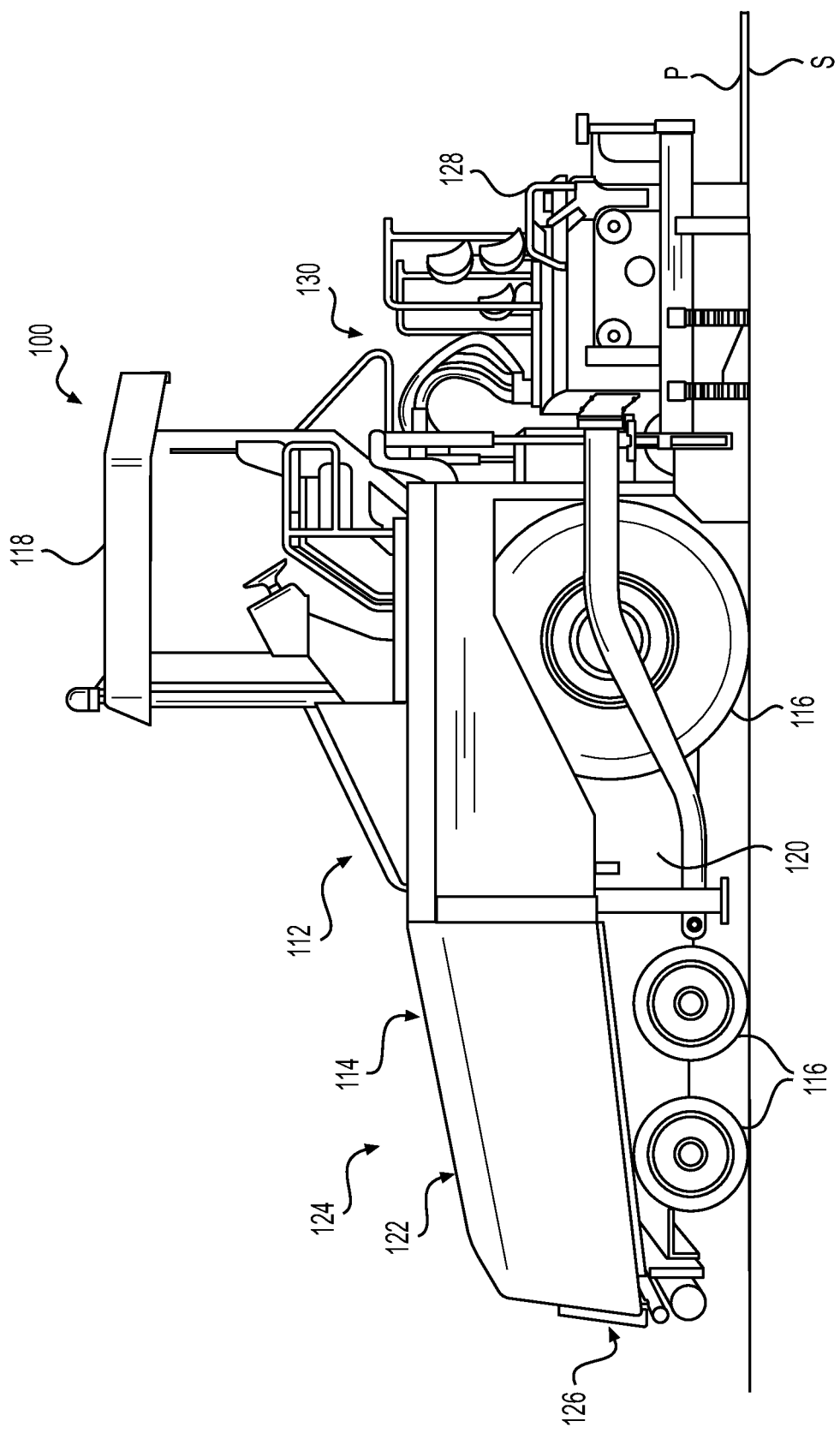
FIG. 1 is a side view of a machine such as a paver machine that may use unexposed fasteners for mounting conveyor wear plates to the conveyor system in the hopper of the machine according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method will be described herein regarding a paving machine, a feeder/hopper, and a feeder protection system having wear plates configured according to various embodiments of the present disclosure.

In some embodiments, the wear plates may reduce feeder bar and conveyor chain wear, ease assembly, and allow for the use of hidden fasteners relative to the hopper/feeder to help prevent the heads of the fasteners from being clogged with asphalt or other abrasive materials.

An exemplary embodiment of a paving machine 100 is shown generally in FIG. 1. The paving machine 100, which may also be referred to as an asphalt paver, may be any machine used to distribute a layer of paving material P on the surface S of a roadway or other area. The paving machine 100 generally includes a tractor portion 112 including a power source 114, such as an internal combustion engine, ground-engaging propulsion elements 116, some or all of which may be powered by the power source 114, and an operator control station 118 (may also be referred to as a cab). The power source 114, ground-engaging propulsion elements 116, and operator control station 118 may all be supported on a frame 120 of the machine 100. The frame 120 may also support various other components and systems, including a hopper 122 supported on a front portion 124 of the frame 120 for receiving the paving material P.

A conveyor 126, which will be discussed below with reference to FIG. 2, may also be supported on the frame 120 and may convey the paving material P received within the hopper 122 to a screed 128, such as a free floating screed, coupled with the paving machine 100, such as via tow arms, at a rear portion 130 of the frame 120. The screed 128 may distribute and, at least partially, compact the paving material P into a mat on a desired paving surface S. The tractor portion 112 of the paving machine 100 may also include hydraulic drives and controls, along with various other known paving machine components, for operating various systems and components of the paving machine 100. The screed 128 of the paving machine 110 may also include additional components and systems, such as, for example, leveling arms, vibrators, sensors, and controllers. Such additional systems and components are not within the scope of the present disclosure and, thus, will not be discussed herein in greater detail.

Figure 2:
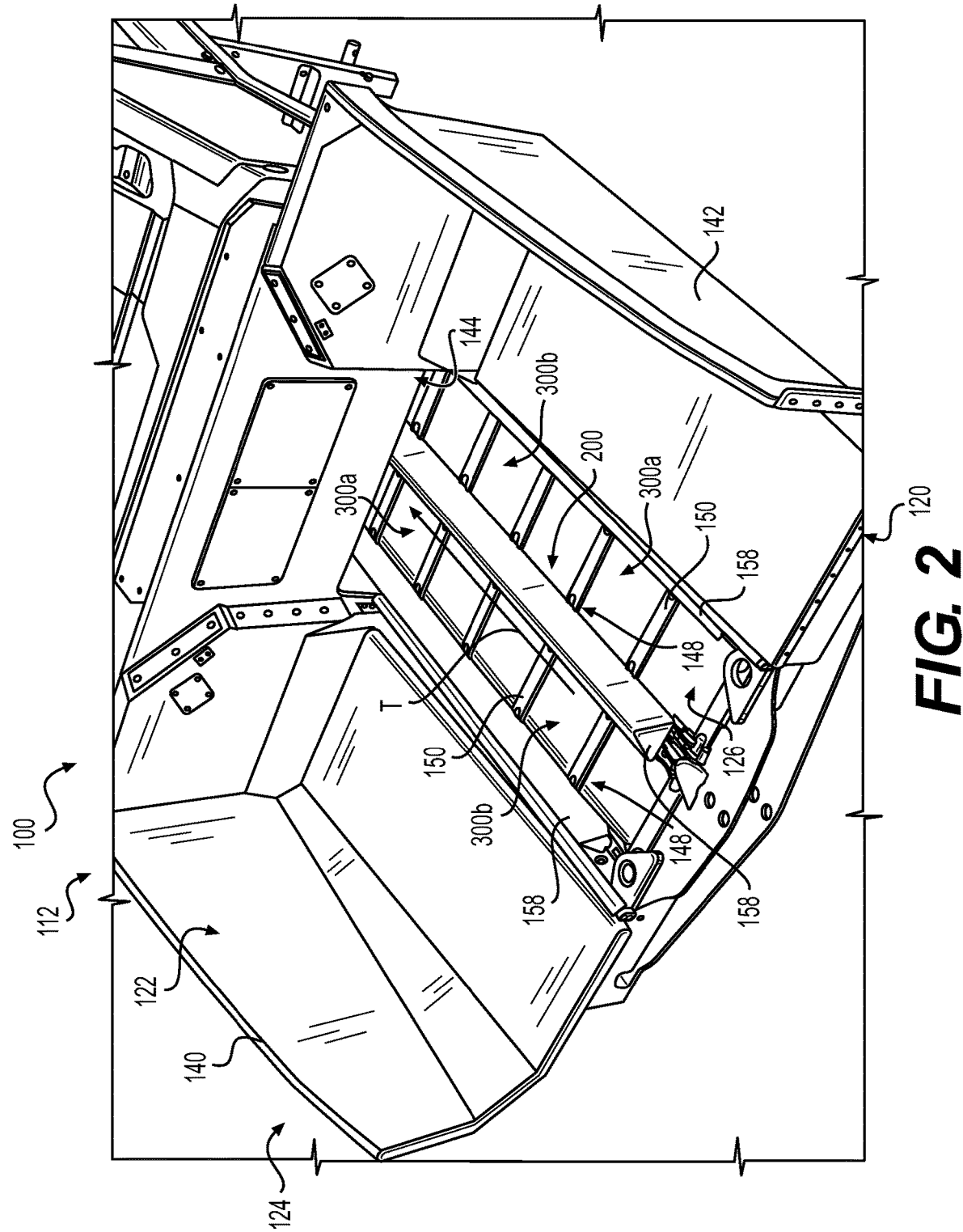
FIG. 2 is a perspective of the feeder/hopper of the machine of FIG. 1 showing the conveyor wear plates mounted in the feeder/hopper without fasteners being exposed to the interior of the feeder/hopper.

Turning now to FIG. 2, the hopper 122 may generally include two hopper walls 140 and 142 that are pivotable relative to the frame 120 to channel the paving material P, which may be received within the hopper 122 from a dump truck traveling in front of the paving machine 100, toward a feeder 144. The feeder 144, or feeder area, may generally represent the conveyance area of the paving machine 100 along which the paving material P is received at the front portion 124 of the machine 100 and transferred to the rear portion 130 (see FIG. 1) of the machine 100.

With continued reference to FIG. 2, the feeder 144 includes a feeder floor 146 (see FIG. 4, may also be referred to as the feeder bed), which may be connected to the frame 120, and may extend from the hopper 122 to the screed 128 (as shown in FIG. 1). As shown in FIG. 2, the conveyor 126 may include two parallel slat chains 148 (may also be referred to as conveyor chains) having a plurality of transverse slats 150 (may also be referred to as feeder bars) connected therebetween. Each slat chain 148 may be pulled by one or more sprockets 152 (e.g. end sprockets, not shown in FIG. 2 but are shown in FIG. 5), which may be mounted on a common shaft and driven by an appropriate power source. During operation of the conveyor 126, transverse flats/feeder bars 150 are positioned above and moved along the feeder floor 146 to convey the paving material P through the feeder 144.

Referring now to FIGS. 2 thru 9, a paving machine 100 that may employ a feeder protection system 200 according to various embodiments of the present disclosure will now be discussed.

Starting with FIGS. 2, and 6 thru 9, the feeder protection system 200 may include at least a first pair of wear plates 300a, 300b, 400a, 400b covering the feeder bed 146. As best seen in FIGS. 6 thru 9, each of the pair of wear plates 300a, 300b, 400a, 400b may include at least one tab 302a, 302b, 402a, 402b, defining a tab aperture 304a, 304b, 404a, 404b.

Figure 4:
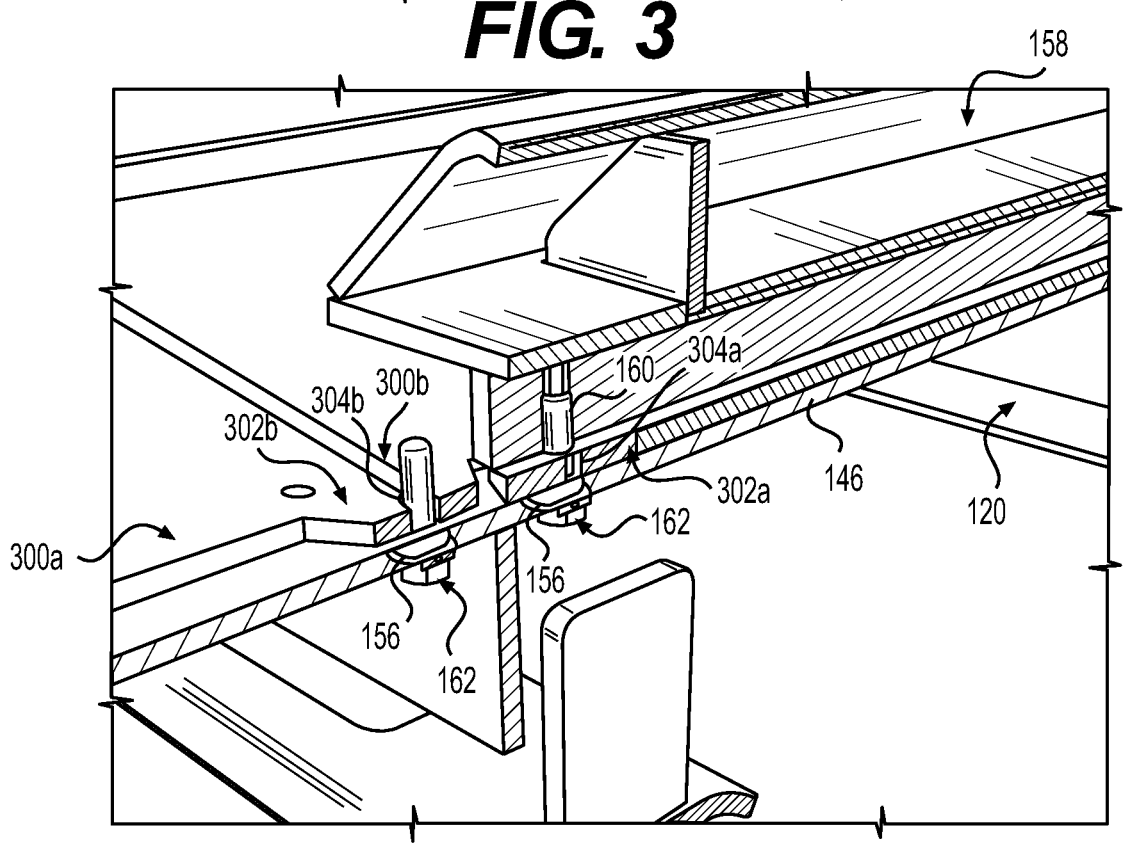
FIG. 4 is another perspective view of another portion of the feeder/hopper of FIG. 2, depicting a center chain guard receiving a fastener that is inserted through the bed of the feeder and through an aperture of a tab of a conveyor wear plate for securing the center chain guard and the wear plate in place. As can be seen, the fastener is shielded from the interior of the feeder including any abrasive material therein.
Figure 5:
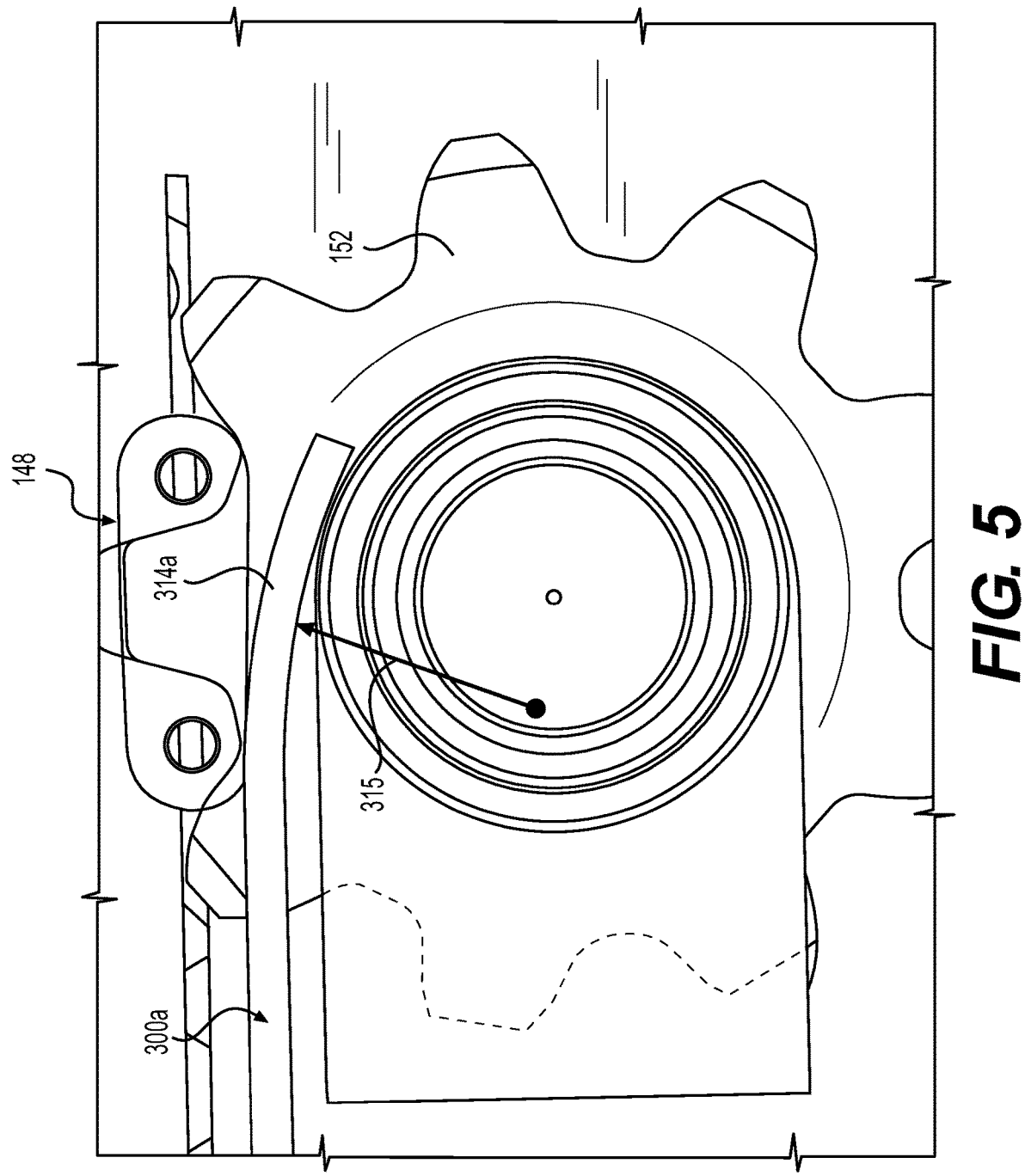
FIG. 5 is a side view of an end portion of the feeder/hopper that is cut away revealing an end drive sprocket, and a bend of a wear plate constructed according to an embodiment of the present disclosure that may reduce feeder bar (not clearly shown) wear as the conveyer chain passes about the sprocket. For clarity, only one chain link is shown at the point of potential contact with the wear plate.

As best seen in FIG. 4, the feeder bed 146 may also define a feeder bed aperture 156 that is aligned with the tab aperture 304a, 304b, etc. Likewise, the feeder protection system 200 may further comprise a chain guard 158 (e.g. a center chain guard) defining a bottom aperture 160 that is also aligned with the tab aperture 304a, 304b, etc. As a result of this arrangement, the feeder bed aperture 156, the tab aperture 304a, 304b, and the bottom aperture 160 of the chain guard 158 are configured to receive the same fastener 162, with its body and head shielded or hidden from the asphalt or other abrasive material that is present in the hopper or the feeder.

Figure 3:
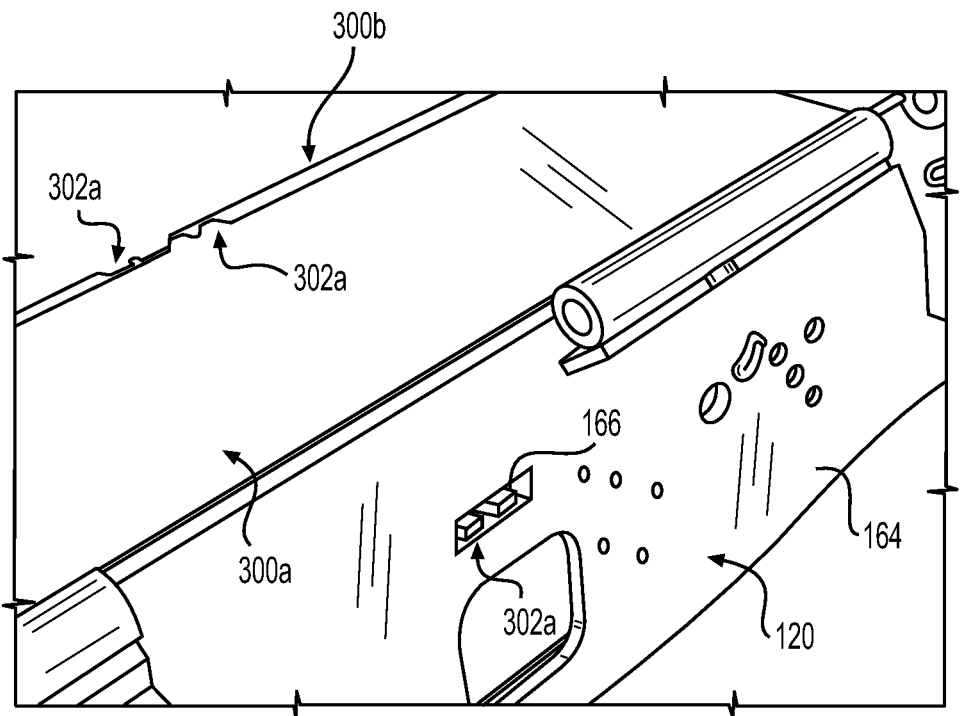
FIG. 3 is a perspective view of a portion of the feeder/hopper of FIG. 2, illustrating a frame member having a slot that receives a tab of a conveyor wear plate according to an embodiment of the present disclosure.

Turning now to FIG. 3, the frame 120 may include a frame member 164 (e.g. a side frame member) that defines a slot 166 (may form a complete rectangular profile or other enclosed perimeter, but not necessarily so) that is configured to receive the at least one tab 302a, 302b for quick assembly and disassembly.

Figure 6:
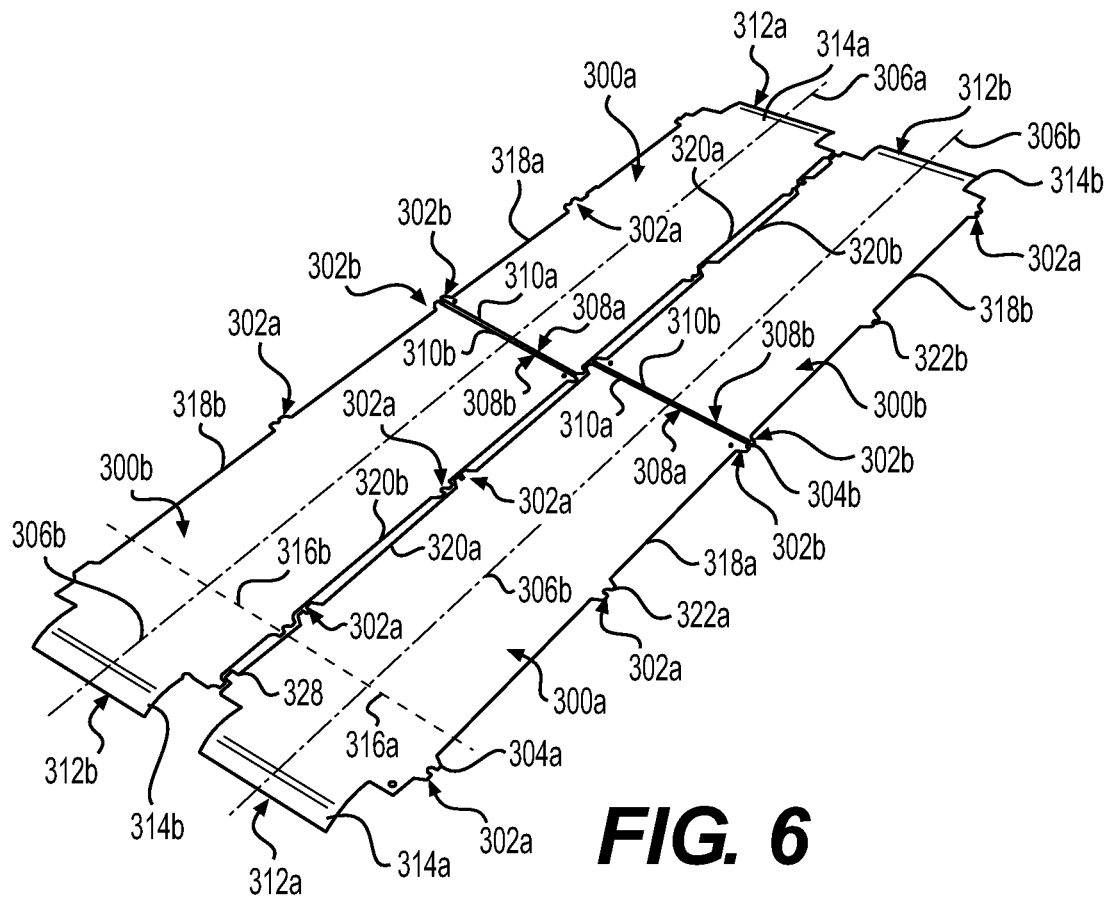
FIG. 6 contains a perspective view of a set of wear plates with tabs configured according to an embodiment of the present disclosure.
Figure 8:
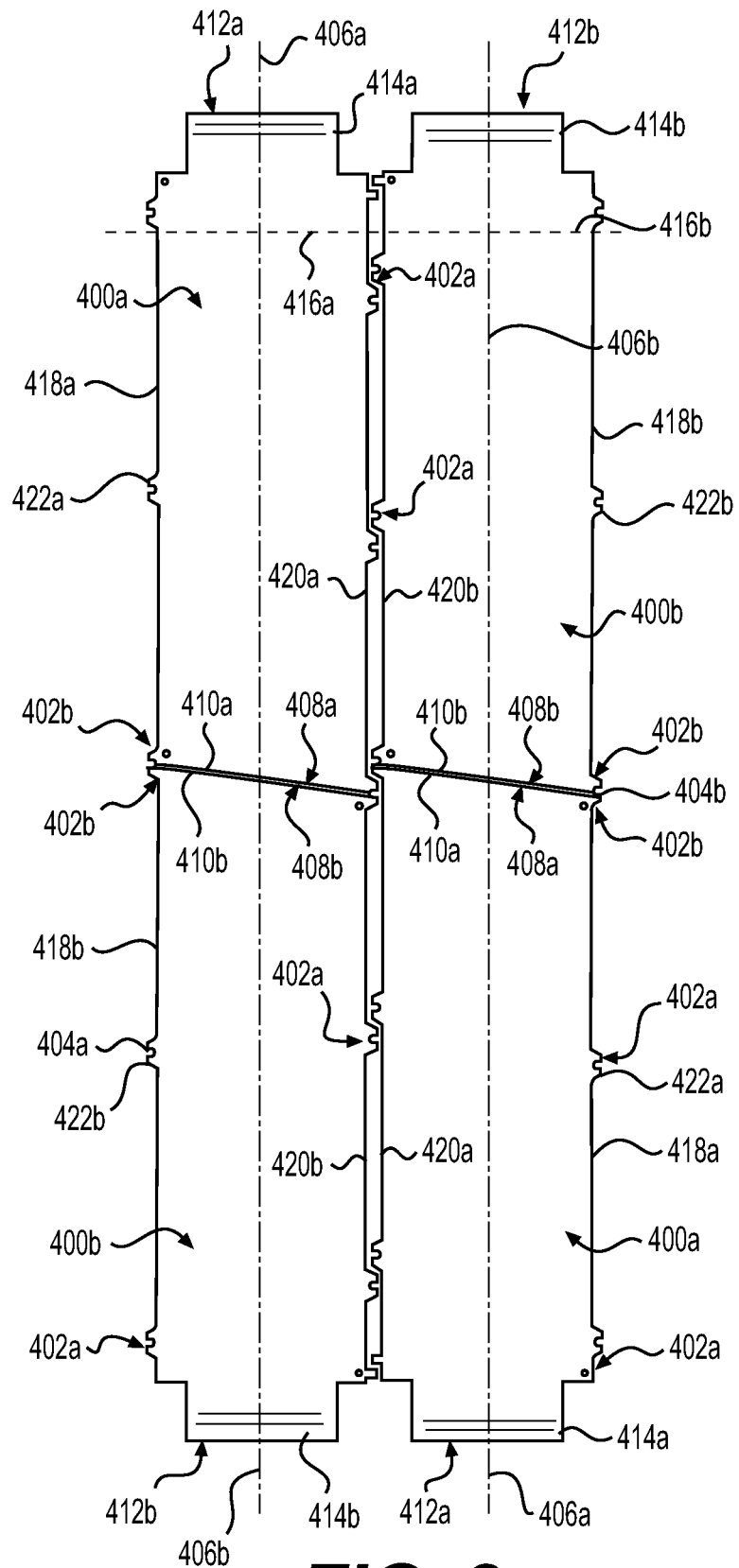
FIG. 8 contains a top view of a set of wear plates with tabs configured to yet another embodiment of the present disclosure.

As seen in FIGS. 2, 6 and 8, the conveyor 126 defines a direction of travel T, and each of the pair of wear plates 300a, 300b, 400a, 400b defines a longitudinal axis 306a, 306b, 406a, 406b that is parallel to the direction of travel T. This may not be the case for other embodiments of the present disclosure.

Each of the wear plates 300a, 300b, 400a, 400b defines a first axial end 308a, 308b, 408a, 408b including a first straight surface 310a, 310b, 410a, 410b, and a second axial end 312a, 312b, 412a, 412b including a bend 314a, 314b, 414a, 414b that defines a radius of curvature 315 (see FIG. 5). The radius of curvature of the bend may range from 80.0 mm to 145.0 mm in certain embodiments, providing suitable guidance and clearance between the wear plates and the conveyor chain and/or the feeder bars.

In some embodiments such as shown in FIG. 9, the first straight surface 410a, 410b of the first axial end 408a, 408b may form an oblique angle 415 to the direction of travel T of the conveyor 126 (or the longitudinal axis 406a, 406b).

Figure 7:
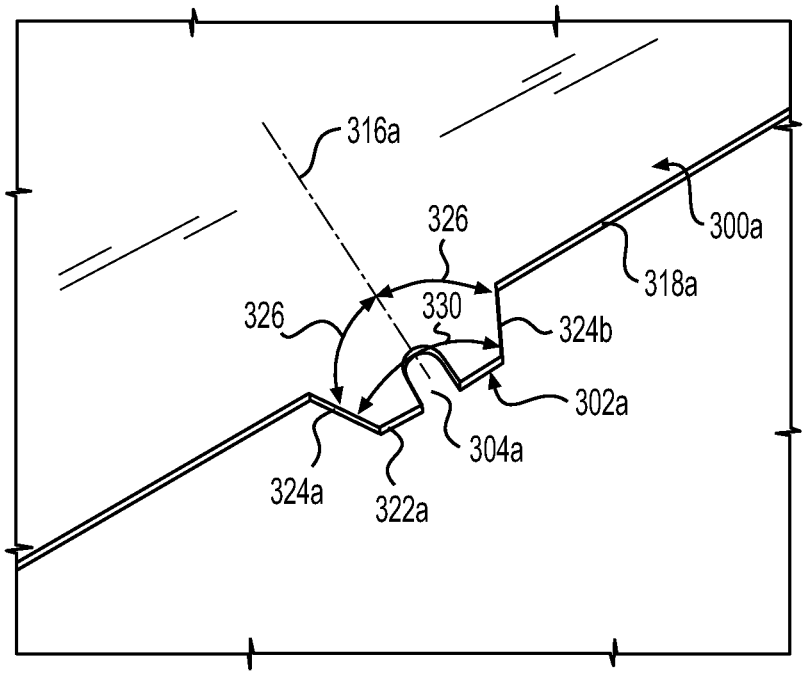
FIG. 7 is an enlarged detail view of a side tab of a wear plate of FIG. 6.

The tab aperture 304a, 304b, 404a, 404b may have any suitable shape such as an enclosed circular perimeter or an open slot, which may ease installation when a fastener is already in place, etc. In FIGS. 4, 7 and 9, the tab aperture 304a, 304b, 404a, 404b may be either a U-shaped open slot (best seen in FIG. 7) or half a U-shaped open slot (when disposed near an axial end).

Now, a wear plate according to another embodiment of the present disclosure that may be provided as a replacement part will now be discussed with reference to FIGS. 5 thru 9.

As best seen in FIGS. 6, 8 and 9, this wear plate 300a, 300b, 400a, 400b may comprise an elongated body defining a longitudinal axis 306a, 306b, 406a, 406b (extends along the direction of travel T of the conveyor 126, may be direction of greatest extent but not necessarily so), and a transverse axis 316a, 316b, 416a, 416b that is perpendicular to the longitudinal axis 306a, 306b, 406a, 406b.

A first axial end 308a, 308b, 408a, 408b, a second axial end 312a, 312b, 412a, 412b, a first side surface 318a, 318b, 418a, 418b that extends from the first axial end 308a, 308b, 408a, 408b to the second axial end 312a, 312b, 412a, 412b, and a second side surface 320a, 320b, 420a, 420b that extends from the first axial end 308a, 308b, 408a, 408b to the second axial end 312a, 312b, 412a, 412b may be provided.

As alluded to earlier herein, a first plurality of tabs 302a, 302b, 402a, 402b may be disposed on the first side surface 318a, 318b, 418a, 418b, and a second plurality of tabs 302a, 302b, 402a, 402b may be disposed on the second side surface 320a, 320b, 420a, 420b. At least one tab 302a, 302b, 402a, 402b of the first plurality of tabs may define a tab aperture 304a, 304b, 404a, 404b, and at least one tab 302a, 302b, 402a, 402b of the second plurality of tabs may define a tab aperture 304a, 304b, 404a, 404b.

At least one tab 302a, 302b, 402a, 402b of the first plurality of tabs extends transversely form the first side surface 318a, 318b, 418a, 418b to a first free end 322a, 322b, 422a, 422b. As best seen in FIG. 7, such a tab may include a first tapered surface 324a extending from the first side surface 318a to the first free end 322a, and a second tapered surface 324b extending from the first side surface 318a to the first free end 322a. The first tapered surface 324a, and the second tapered surface 324b form an oblique angle 326 with the transverse axis 316a. The tab aperture 304a has a U-shaped configuration that is open on the first free end 322a. Other configurations are possible in other embodiments of the present disclosure.

As best seen in FIGS. 6 and 8, the first plurality of tabs 302a, 302b, 402a, 402b may be staggered axially relative to the second plurality of tabs 302a, 302b, 402a, 402b. This arrangement may allow the tabs of one wear plate to be disposed axially proximate the tabs of another wear plate, providing axial abutment in some cases.

In addition, the at least one tab 302b, 402b of the first plurality of tabs may be disposed proximate to the first axial end 308a, 308b, 408a, 408b, extending transversely form the first side surface 318a, 318b, 418a, 418b to a first free end 322b, 422b, and includes a first tapered surface 324a extending from the first side surface 318a, 318b, 418a, 418b to the first free end 322b, 422b, forming an oblique angle 326 with the transverse axis 316a, 316b. In such a case, the tab aperture 304b, 404b may have a half U-shaped configuration that is open on the first free end 322a, 322b, while the at least one tab of the second plurality of tabs is a solid tab 328 (i.e. lacks an aperture) that is disposed proximate to the second axial end 312a, 312b, 412a, 412b of the wear plate 300a, 300b, 400a, 400b.

Next, a wear plate according to another embodiment of the present disclosure that may be provided as a replacement part will now be discussed with reference to FIGS. 5 thru 9.

Such a wear plate 400a, 400b as shown in FIG. 9 may include a first axial end 408a, 408b that has a first oblique flat surface 430a, 430b relative to the transverse axis 416a, 416b forming an acute angle 432 therewith. Furthermore as shown in FIG. 8, the second axial end 412a, 412 may include a bend 414a, 414b defining a radius of curvature 315 (similar to what has been previously described with reference to FIG. 5) in a plane perpendicular to the transverse axis 316a, 316b, 416a, 416b (i.e. the plane of FIG. 5). In some embodiments, the acute angle 432 may range from 5.0 degrees to 15.0 degrees, and the radius of curvature 315 may range from 80.0 mm to 145.0 mm.

As also alluded to earlier herein and shown in FIG. 7, at least one tab may include a first tapered surface 324a extending from the first side surface 318a to the first free end 322a, and a second tapered surface 324b extending from the first side surface 318a to the first free end 322a. As a result, the first tapered surface 324a, and the second tapered surface 324b may form an included oblique angle 330 with each other. This may not be the case for other embodiments of the present disclosure. It is to be understood that many or most of the tabs of the various wear plates 300a, 300b, 400a, 400b may have a similar or identical configuration to each other including their apertures. Similar statements may be made about the solid tabs 328, 428. Again, this may not be the case for other embodiments of the present disclosure.

As also mentioned previously herein and shown in FIG. 9, at least one tab 402b of the first plurality of tabs is disposed proximate to the first axial end 408a, 408b, and has tab aperture with a half U-shaped configuration that is open as well as a first tapered surface (324a, see FIG. 7) that forms an obtuse angle with the free end (422b, see FIG. 9). Also, at least one tab of the second plurality of tabs may be a solid tab 428 (i.e. lacks an aperture) that is disposed proximate to the second axial end 412a, 412b of the wear plate 400a, 400b.

It should be noted that the particulars of the wear plates as well as their construction, configuration, method of assembly, etc. are provided by way of an example only and it is contemplated that other embodiments of the present disclosure are possible.

For example, the arrangement, function, and dimensions of the various features of any embodiment of a wear plate as discussed herein may be altered as needed or desired to be different than what has been specifically mentioned herein.

INDUSTRIAL APPLICABILITY

In practice, a wear plate, a set of wear plates, a feeder protection system, or a machine using any of these components according to any embodiment described herein may be sold, bought, manufactured or otherwise obtained in an OEM (original equipment manufacturer) or after-market context.

Any portion of the wear plate may be manufactured from a rigid material such as stainless steel, tool steel, aluminum, or the like and may be formed using a bending and/or forming operation (e.g. via a press brake, stamping die, progressive die, etc.). Alternatively, or in addition to these operations, the perimeter of the wear plate may be manufactured using laser cutting, water-jet cutting, etc.

Various embodiments of the machine and its components may be characterized as a "hardwareless" design as there is no exclusively used hardware to directly mount/secure plates in place on machine. Rather, these wear plates "indirectly" utilize mounting hardware intended to bolt-on to other surrounding machine components along with placement slots in the machine frame.

With this design, there is no necessary "top down" mounting hardware that is exposed to asphalt. Thus, various embodiments of the present disclosure may simplify and expedite the removal of these wear plates. Previous designs used direct top-down installed countersink bolts that held the bed plate in place. These bolts contained a recessed hex pattern for wrench engagement that would need to be clear out of asphalt prior to them being removed, which added significant wear plate change-out time.

Wear plates may contain multiple tabs/extrusions that engage slots in the machine frame such as side plates to properly position and secure the wear plates to the machine in all directions (Transverse axis—LH/RH, Y—Vertically, and Longitudinal axis—front/rear). To ease the installation of the wear plates, these tabs contain an additional feature in the form of having a tapered shape. This tapered tab shape may allow fine tune adjustment of the plate location to be made for adjusting plate positioning and to accommodate part shape/profile tolerance stack-up. This may help to ensure that plates fit multiple machines. The tapered tab shape and interface into the machine frame side plate slot are shown in FIG. 3.

These same tapered tabs may get "sandwiched" or "trapped" in the bolted joint with the center chain guard, which secure the wear plates flat directly against the paver frame floor. The tapered tabs contain an open slot allowing the mounting bolt for the center chain guard to pass through. As a result, the tab is ultimately part of the chain guard bolted joint. This is shown in FIG. 4.

The wear plates contain a specific symmetric shape with specific tapered tab locations to allow common part numbers to be used both in the front and rear positions. This arrangement may minimize the number of different wear plate part numbers required per machine. For example, the left-front plate is also used in the right-rear position and the right-front plate is also used in the left-rear position. The specific tapered tab locations are shown for example in FIG. 8.

Wear plates may contain selectively chosen mounting tab locations on the corners of plates. This may ensure that the ends or corners of the plates are fully secured "flat" against the frame so it is a smooth/level/in-plane transition from front wear plates to rear wear plates (as they are nearly perfectly vertically aligned). This may help to ensure that the conveyor drag chain feeder bars do not "catch" on the plate-to-plate seam which maximizes feeder bar life as wear is minimized at this joint. This may also reduce the noise generated from the feeder bars crossing over this seam.

These wear plates also contain another feature at the plate-to-plate seam to help provide a smooth/quite feeder bar transition across this seam. This feature consists of the front and rear plates both having an angled edge creating a seam that is intentionally non-perpendicular (82.5 degrees) to the material flow/feeder chain rotating direction at this seam location. In the event the front and rear plates are not vertically aligned (thus leaving an exposed edge that can catch/damage the passing feeder bar if this seam was 100% perpendicular to material flow/feeder chain direction), a "catch" edge may be created. This angled seam may minimize the length of this exposed "catch" edge that the feeder bar would need to cross over in order to move from the front plate to the rear plate. Consequently, it may act as a localized lead-in transition at this plate-to-plate seam. The angled seam is shown best in FIG. 9.

Also, specifically at this plate-to-plate seam location, each front and rear bed plate contains exactly ½ of the tapered mounting tab (and bolt pass through slot-discussed above) on the extreme corner of the plates. This is the best tab location to help ensure that both plates are secured vertically in the same plane at this seam. Again, this is another measure to keep feeder bars moving smoothly (with little noise or wear) across this front-to-rear plate seam. This concept is shown for example in FIG. 9.

The wear plates also have a specific tailored end bend profile/shape that minimizes feeder bar rubbing/wearing against these wear plates as the chain rotates around the end drive sprockets. Due to the chain dynamics as it goes through the sprocket diameter, the feeder bar may be prone to "digging into" the bed plate. So, this specific bend profile minimizes this interference. This may be seen for example in FIG. 5.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A paving machine comprising:
    a frame;
    a screed;
    a hopper supported on the frame and configured to receive paving material;
    a feeder including a feeder bed that extends from the hopper to the screed;
    a conveyor that is disposed above the feeder bed for conveying the paving material to the feeder; and
    a feeder protection system including at least a first pair of wear plates covering the feeder bed, wherein each of the pair of wear plates include at least one tab defining a tab aperture, wherein the feeder bed defines a feeder bed aperture that is aligned with the tab aperture.

2. The paving machine of claim 1 wherein the frame includes a frame member defining a slot that is configured to receive the at least one tab.

3. The paving machine of claim 2 wherein the frame member is a side frame member.

4. The paving machine of claim 1 wherein the feeder protection system further comprises a chain guard defining a bottom aperture that is aligned with the tab aperture.

5. The paving machine of claim 4 wherein the feeder bed aperture, the tab aperture, and the bottom aperture of the chain guard are configured to receive the same fastener.

6. The paving machine of claim 5 wherein the conveyor defines a direction of travel, each of the pair of wear plates defines a longitudinal axis that is parallel to the direction of travel, and each of the wear plates defines a first axial end including a first straight surface, and a second axial end including a bend that defines a radius of curvature.

7. The paving machine of claim 6 wherein the radius of curvature of the bend ranges from 80.0 mm to 145.0 mm.

8. The paving machine of claim 6 wherein the first straight surface of the first axial end forms an oblique angle to the direction of travel of the conveyor.

9. The paving machine of claim 6 wherein the tab aperture is either a U-shaped open slot or half a U-shaped open slot.

10. A wear plate for use with a paving machine comprising:
a body defining a longitudinal axis, and a transverse axis that is perpendicular thereto;
a first axial end, a second axial end, a first side surface extending from the first axial end to the second axial end, and a second side surface extending from the first axial end to the second axial end;
a first plurality of tabs disposed on the first side surface; and
a second plurality of tabs disposed on the second side surface;
wherein at least one tab of the first plurality of tabs defines a tab aperture, and at least one of the second plurality of tabs defines a tab aperture,
wherein the at least one tab of the first plurality of tabs extends transversely form the first side surface to a first free end, and includes a first tapered surface extending from the first side surface to the first free end, and a second tapered surface extending from the first side surface to the first free end, and the first tapered surface and the second tapered surface form an oblique angle with the transverse axis.

11. The wear plate for use with a paving machine of claim 10 wherein the tab aperture has a U-shaped configuration that is open on the first free end.

12. The wear plate for use with a paving machine of claim 10 wherein the first plurality of tabs are staggered axially relative to the second plurality of tabs.

13. The wear plate of claim 10 wherein the at least one tab of the first plurality of tabs is disposed proximate to the first axial end, extending transversely form the first side surface to a first free end, and includes a first tapered surface extending from the first side surface to the first free end, forming an oblique angle with the transverse axis, the tab aperture has a half U-shaped configuration that is open on the first free end, and the at least one tab of the second plurality of tabs is a solid tab that is disposed proximate to the second axial end of the wear plate.

14. A wear plate for use with a paving machine comprising:
a body defining a longitudinal axis, and a transverse axis that is perpendicular thereto;
a first axial end, a second axial end, a first side surface extending from the first axial end to the second axial end, and a second side surface extending from the first axial end to the second axial end;
a first plurality of tabs disposed on the first side surface; and
a second plurality of tabs disposed on the second side surface;
wherein the first axial end includes a first oblique flat surface relative to the transverse axis forming an acute angle therewith, and the second axial end includes a bend defining a radius of curvature in a plane perpendicular to the transverse axis,
wherein the acute angle ranges from 5.0 degrees to 15.0 degrees and the radius of curvature ranges from 80.0 mm to 145.0 mm.

15. The wear plate for use with a paving machine of claim 14 wherein at least one tab of the first plurality of tabs defines a tab aperture, and at least one of the second plurality of tabs defines a tab aperture.

16. The wear plate for use with a paving machine of claim 15 wherein the at least one tab of the first plurality of tabs extends transversely form the first side surface to a first free end, and includes a first tapered surface extending from the first side surface to the first free end, and a second tapered surface extending from the first side surface to the first free end, and the first tapered surface and the second tapered surface form an included oblique angle with each other.

17. The wear plate for use with a paving machine of claim 15 wherein
the at least one tab of the first plurality of tabs is disposed proximate to the first axial end, extending transversely form the first side surface to a first free end, and includes a first tapered surface extending from the first side surface to the first free end, forming an obtuse angle with the free end, the tab aperture has a half U-shaped configuration that is open on the first free end, and the at least one tab of the second plurality of tabs is a solid tab that is disposed proximate to the second axial end of the wear plate.

* * * * *